United States Patent [19]

Hwa

[11] 4,284,656
[45] Aug. 18, 1981

[54] NOVEL PROTEIN CURD PRODUCT AND PROCESS OF PREPARATION

[76] Inventor: Stephen C. P. Hwa, 10 Belvue Ct., Penfield, N.Y. 14526

[21] Appl. No.: 103,732

[22] Filed: Dec. 14, 1979

[51] Int. Cl.$^3$ ............................ A23J 1/14; A23J 3/00
[52] U.S. Cl. .................................. 426/641; 426/656; 260/123.5
[58] Field of Search ............... 426/634, 656, 652, 641; 260/123.5

[56] References Cited

U.S. PATENT DOCUMENTS

| | | | |
|---|---|---|---|
| 3,268,335 | 8/1966 | Circle et al. | 426/634 |
| 3,891,777 | 6/1975 | Boyer | 426/656 X |
| 3,944,676 | 3/1976 | Fridman et al. | 426/656 X |
| 3,982,025 | 9/1976 | Hashimoto et al. | 426/634 X |
| 4,064,277 | 12/1977 | Yokotsuka et al. | 426/656 X |
| 4,105,803 | 8/1978 | Peng | 426/634 X |
| 4,137,339 | 1/1979 | Kudo et al. | 426/634 |

*Primary Examiner*—Robert A. Yoncoskie
*Attorney, Agent, or Firm*—Fred L. Denson

[57] ABSTRACT

A high protein, low fat foodstuff which is comprised of a protein curd product and the process for its preparation are described.

The protein curd product is prepared under carefully controlled process conditions. It is light in color, bland in flavor and has an elastic body which provides a smooth texture, tender and rich mouth feel. These properties render it extremely suitable as a supplement to or substitute for a meat, cheese, egg or other type of foodstuff. The process for preparing the protein curd product of this invention includes extracting protein from a defatted soy bean material such as a defatted soy bean flake with water. After an aqueous protein extract containing at least 2.0 weight percent protein is separated from the residual defatted soy bean material, protein is coagulated from the aqueous extract to produce a protein curd product and a whey. The coagulation is accomplished by adjusting the pH to within the range from about 5.4 to about 8.0 and heating the aqueous protein extract to within a temperature range from about 80° C. to about 170° C. The protein curd product is separated from the whey, washed and prepared for consumption.

13 Claims, 2 Drawing Figures

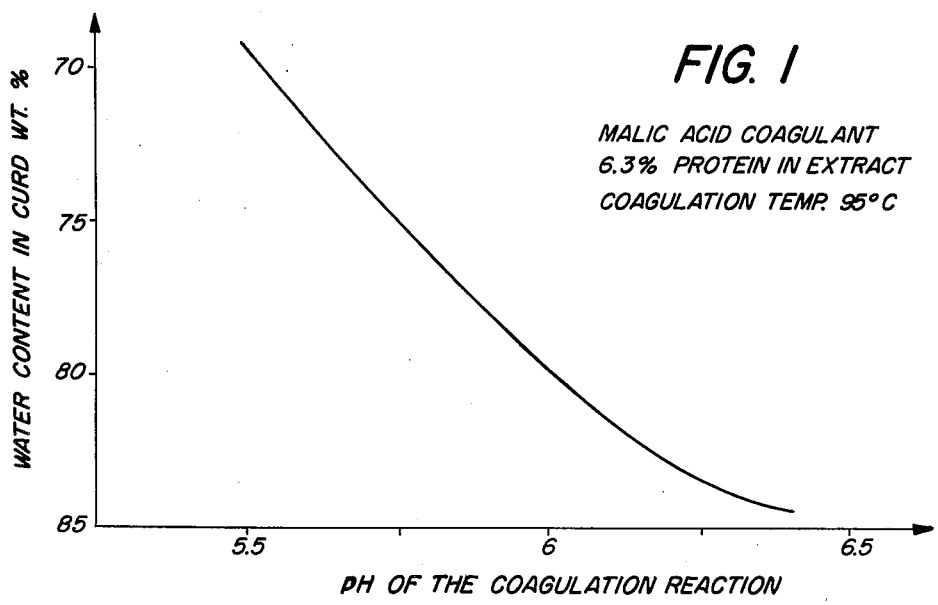
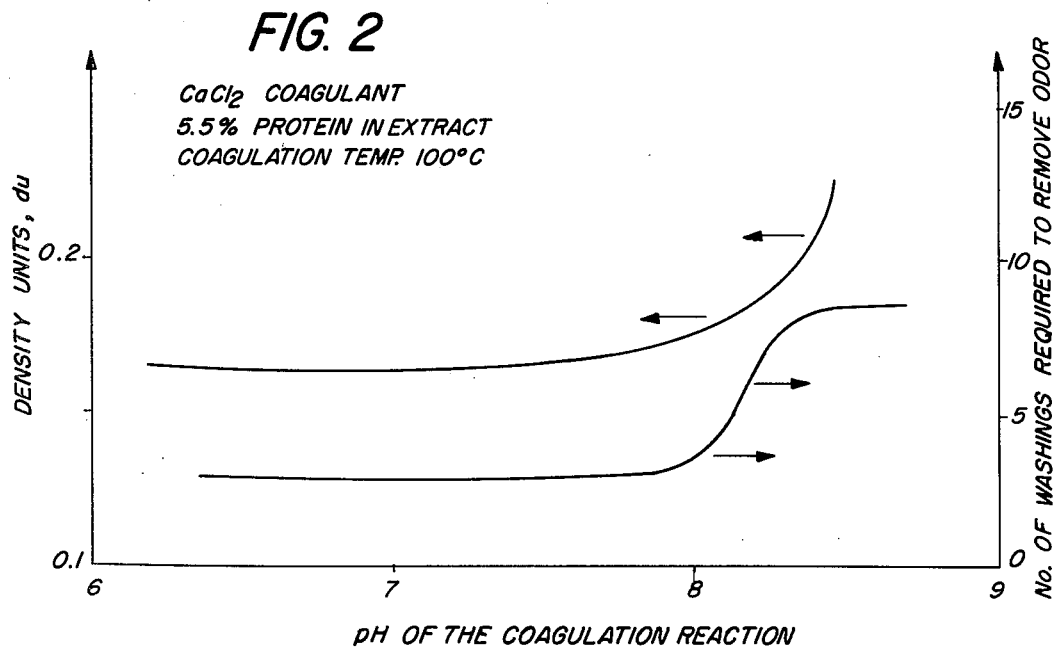

NOVEL PROTEIN CURD PRODUCT AND PROCESS OF PREPARATION

BACKGROUND OF THE INVENTION

This invention relates to a novel high protein, low fat foodstuff material which is comprised of a uniquely prepared protein curd product, and the process for the preparation of this material.

The rapidly increasing cost of food products and the world-wide shortage of food products has resulted in extensive research and marketing of food supplements and replacements. Soy bean products have been used extensively in this regard based on their availability, relatively low cost, protein content and compatability with other food materials. The prior art is replate with textbooks, patents and papers which have been made available regarding this subject matter. A meaningful summary of the state of the art is provided in *Vegetable Protein Processing* by L. P. Hanson (Food Technology Review No. 16, Noyes Data Corporation, 1974) and *Soybeans: Chemistry and Technology Vol. I Proteins* by A. K. Smith and S. J. Circle (AVI Publishing Company, 1978). A typical prior art process for preparing protein foodstuff materials from soy bean protein, casein, wheat gluten and the like is described in U.S. Pat. No. 3,674,500 to Nagasawa et al (July 4, 1972).

Most of the prior art processes have a common objective of providing an acceptable food substitute or supplement which has the desired properties of good texture and mouth feel, light color and bland taste. However, the complexities associated with the extensive, elaborate and numerous processing steps which are required to obtain products having the desired set of properties significantly increase the cost of the final product.

In many instances, the process involves precipitating protein from a water extract at the isoelectric point (pH between 4.0 and 5.0) and thereafter washing and drying the isolate (precipitated protein). The isolate is neutralized by alkali and redissolved in water for coagulation. Sometimes heat denaturing is used for coagulation and in some instances, protein solution is spun into fiber in a coagulation bath. Repeated washings with water are frequently required after coagulation. Needless to say, such numerous process steps are time consuming and add to the cost of the product. Attempts have been made to reduce the processing costs by utilizing extruded texturized vegetable protein having fibrous or spongy type structures.

Many of the products produced by prior art processes have a coarse and tough texture and/or a dry, grainy and pulpy mouth feel. Others have an undesirable flavor which is difficult to remove or an undesirable coloring which limits their applications. While they generally are employed primarily as a food supplement such as a filler or extender, they have limited use as a food substitute or a food item for direct consumption.

OBJECTS OF THE INVENTION

It is therefore an object of this invention to provide a high protein, low fat product which is suitable for use as a supplement to or substitute for a variety of food preparations.

It is a further object of this invention to provide a protein curd product having an acceptable color, taste, texture and mouth feel.

It is still another object of the invention to provide a cost efficient process for preparing a protein curd product which is suitable for use as a supplement to or substitute for a variety of food preparations.

SUMMARY OF THE INVENTION

These and other objects are accomplished with a high protein, low fat foodstuff material which is a protein curd product prepared under carefully controlled process conditions. The protein curd product of this invention is light in color, bland in flavor and has an elastic body which provides a smooth texture and tender, rich mouth feel. These properties render it extremely suitable as a supplement to or substitute for a meat, cheese, egg or other type of foodstuff. The process for preparing the protein curd product of this invention includes extracting protein from a defatted soy bean material such as a defatted soy bean flake with water. After an aqueous protein extract containing at least 2.0 weight percent protein is separated from the residual defatted soy bean material, protein is coagulated from the aqueous extract to produce a protein curd product and a whey. The coagulation is accomplished by adjusting the pH to within the range from about 5.4 to about 8.0 and heating the aqueous protein extract to within a temperature range from about 80° C. to about 170° C. The protein curd product is separated from the whey, washed and prepared for consumption.

BRIEF DESCRIPTION OF THE DRAWINGS

FIG. 1 is a graphical representation showing the relationship between the interstitial water content in the protein curd product and the pH of a coagulation reaction.

FIG. 2 is a graphical representation showing on the abscissa and left ordinate the relationship between pH of a coagulation reaction and the color of the final protein curd product, and showing on the abscissa and right ordinate the relationship between pH of a coagulation reaction and the number of washings of the protein curd product.

DETAILED DESCRIPTION OF THE INVENTION

The protein curd product produced by the novel process of this invention is extremely suitable for use as a food substitute or food supplement based on product color, product flavor, product texture and mouth feel, and cost and simplicity of production. The parameters of each process condition and process step of the present invention are critical, in that any variation therefrom has an adverse effect on the properties of the product. The preparation of prior art products intended for foodstuff usage involves numerous additional and more complex processing steps, and thus is far less cost efficient and, in most cases, produces products with inferior properties for food usage.

The protein curd product of this invention has a tender, elastic body texture which provides a very desirable, smooth and rich mouth feel. It may be used as a replacement for or mixed with meat, cheese, eggs or other food substances. The product may also be coalesced into a ball or patty form having the mouth feel of meatballs or hamburgers. Additionally, it readily absorbs seasoning and may be cooked with vegetables to simulate diced meat dishes, or it may be scrambled like eggs.

It has been determined that the properties of texture and mouth feel of the product of this invention are a function of the interstitial water retained in association with the product's protein molecules. Water which remains in the pores between curd granules during processing has no significant adverse effect on product texture or mouth feel. The water retained in pores is usually removed from the product by centrifuging or other means in the final process steps of product separation from the whey. However, the interstitial water associated with the product's protein molecules is not readily removed by physical separation in a manner similar to the water retained in the pores. Instead, the amount of interstitial water retained in the final product is related to certain process conditions, including the protein concentration in the aqueous protein extract and the conditions under which the protein curd product may be heated. In order to achieve acceptable texture and mouth feel properties in the final product, it is essential that the final product contain at least 72% by weight but not more than 85% by weight of interstitial water associated with it. Quantities of water below the 72% minimum result in a product having a tough, coarse texture and sometimes a grainy, pulpy and dry mouth feel. When more than 85% by weight of interstitial water is retained, the product is mushy and difficult to separate from the whey or washing water and thus has undesirable flavor.

In accordance with the production process of the present invention, the initial tenderness of the material is controlled by the process conditions described herein to render it suitable for a very broad range of food applications. Upon further processing this material into the finished food item, the tenderness of the material is further controllable by the cooking process. The material is thus a very versatile material whose texture can be tailored to meet the requirements of a particular food item. In contrast, the prior art products usually have more limited applications because in many cases they are denatured to a low interstitial water content, which causes a loss of tenderness. These products are frequently tough, pulpy, dry or have a grainy mouth feel which is not reversible by further processing.

The protein curd product of this invention is characterized by an acceptable bland flavor. Such a bland flavor permits the product to easily absorb the flavor of any seasoning, thus rendering it useful for a broad variety of applications. The product flavor is a function of certain processing conditions such as the pH of the aqueous protein extract. As explained below, a pH above 8.0 when a bivalent cationic salt is used as the coagulating agent, results in the product having a rotten egg odor which adversely alters its bland flavor, until the odor is removed by repeated washings of the product. By using the carefully controlled processing conditions specified herein, the product contains an acceptable odor and bland flavor, reducing the necessity for repetitious washings.

The product of this invention also has a very acceptable light color which is attributable to certain processing conditions. A light colored curd, having an average optical density of less than 0.20 density units as measured by a reflection densitometer (using a white paper substrate having a density of 0.12 du) is produced by the process of this invention. However, when the pH conditions are too high (i.e. greater than 8.0 when a cationic bivalent metallic salt is used as the coagulating agent) or when the maximum processing temperature is exceeded, the curd product has an unacceptably dark discoloration. The light colored product of this invention readily absorbs the color of other food substances with which it is utilized such as red tomato-containing substances, brown gravies, yellow eggs, etc. Obviously, a discolored, dark product cannot absorb the color of lighter food substances such as eggs or ground meat.

The high protein, low fat foodstuff material of this invention comprises a protein curd product which is extracted from a defatted soy bean material. Any type of defatted soy bean material is suitable as a starting material for the extraction step of the present invention. A granular or powder defatted soy bean flake having a Nitrogen Solubility Index of 40% to 65% is typically utilized. Protein is extracted from the defatted soy bean material with water, using techniques which are well known in the art. A generally accepted mode for extracting involves soaking the soy bean material in water and then separating the aqueous protein extract from the residual soy bean material. While the extraction can be accomplished by using anywhere from less than 1 to 100 or more parts by weight of water per part by weight of soy bean material, the unique characteristics of the final product are obtainable only when the protein concentration in the extract is at least 2.0% by weight. Since higher protein concentrations in the extract have no adverse effect on the quality of the product, there is no maximum limitation on the protein concentration. As a practical matter, however, since extracting efficiency decreases as protein concentration in the extract increases, a preferred protein concentration is from about 3.5% by weight to about 9% by weight. Thus, the amount of water, the amount of soy bean material and extraction conditions of time, temperature and pressure are controlled to provide an aqueous protein extract having a protein concentration within the indicated ranges.

As previously mentioned, the texture and mouth feel properties of the product of the invention are significantly adversely altered when the interstitial water content of the curd is less than 72% by weight or greater than 85% by weight. It has been found that when the protein concentration in the extract is less than 2.0 weight percent, the water content of the curd product is less than the required 72%, making its texture grainy, pulpy and dry, and thus unacceptable.

Upon completion of the extraction step, the aqueous protein extract is separated from the residual defatted soy bean material by any of several standard methods known in the art such as filtering, pressing, etc. The protein curd product is coagulated from the aqueous protein extract by adjusting the pH by fermentation, by the addition of a food grade acid, by the addition of a bivalent cationic salt, or by the addition of a bivalent cationic salt with a food acid or food base, and by heating the extract to within a temperature range from about 80° C. to about 170° C. The pH adjustment is accomplished to provide the final liquid suspension (whey) of the coagulation reaction with a pH within the range from about 5.4 to about 8.0. The heating time is dependent upon the temperature utilized, the lower heating temperatures requiring longer times and the higher temperatures requiring shorter times. At 80° C., the minimum heating time is about 10 minutes, while at 170° C., the minimum heating time is 30 seconds or less. When the maximum temperature is exceeded, the water content of the protein curd product is less than the required 72%, making its texture rough and coarse and thus unacceptable. Also, the color of the product is unacceptably dark. When the minimum heating temperatures or times are not met, the protein curd is not completely separated from the whey and the water content of the protein curd product exceeds the required maximum of 85%.

When the pH adjustment is properly made, the whey has a final pH within the range from about 5.4 to about 8.0. Adjustments to the lower part of this range, i.e. 5.4 to 6.4, are accomplished either by allowing the extract to ferment at 20° C. to 60° C. for 0.5 hours to 10 hours or more, or by the addition of a food grade acid such as hydrochloric acid, citric acid, malic acid, etc., or by the addition of a bivalent cationic salt such as calcium chloride, calcium sulfate, magnesium chloride, magnesium sulfate, etc. When the maximum pH of 6.4 is exceeded when either a food grade acid or bivalent cationic salt is used, the curd may not separate from the whey and the water content of the final protein curd product exceeds the 85% maximum. When the pH falls below the minimum of 5.4, the final curd product has a water content of less than 72%, which causes a grainy and pulpy texture and a dry mouth feel.

Since the extraction efficiency is sometimes greater in the alkaline state, the pH adjustment to within the entire preferrred range of 5.4 to 8.0 for the final liquid suspension is also alternatively accomplished by the addition of a food grade base such as calcium hydroxide, magnesium hydroxide, sodium hydroxide, etc. However, when a food grade base is used, it has been found that it is also necessary to add from about 0.2 to about 2.0 millimoles of a bivalent cationic salt for each gram of protein in the extract. Salt concentrations higher than the maximum result in a curd product having a water content which is too low, thus causing a grainy, pulpy texture and a dry mouth feel. Salt concentrations which fall below the indicated range result in incomplete coagulation. Also, if the pH of the whey is permitted to exceed 8.0, the curd product has an unacceptable rotten egg odor which can only be removed by repeatedly washing the protein curd product. As in the case of the pH adjustment with the acid or salt, if the pH is below 5.4, the final curd product has a water content less than 72%, which detracts from its texture properties.

The food acid, food base or bivalent cationic salt coagulating agent may be added to the aqueous protein extract before it is heated to within the temperature range of about 80° C. to about 170° C. or the coagulating agent may be added to the extract while it is maintained within the temperature range of about 80° C. to about 170° C. Where the required pH adjustment is achieved by fermentation, the use of a coagulating agent is not required.

The coagulation step results in the formation of the protein curd product and a whey. The curd product is separated from the whey by conventional techniques and washed with water. The water is removed from the protein curd product by a centrifuge or other suitable means and the protein curd product is then prepared for consumption. Unless otherwise indicated, all pH values are measured at room temperature.

The final product is particulate in nature and has an elastic body texture with a smooth, tender and rich mouth feel. It has an essentially bland flavor and is light in color. The size of the product particles varies from 1 millimeter and less to 10 millimeters and more. They are easily coalesced in the cooking process into larger size pieces. When the protein curd product is mixed with flavoring ingredients, it can be sauteed, broiled, simmered, steamed, fried, barbecued or cooked in any other fashion with or without other food components such as vegetables, tuber foods, grains, meats, etc.

Additional non-soy aqueous protein solutions (i.e. solutions not derived from soy based materials) or other bean or vegetable protein solutions, may be added to the aqueous protein extract without adversely affecting the properties of the final product. However, it is preferable that the final aqueous composition contain at least 70% by weight of the aqueous protein extract. The final composition is processed in the same manner to produce a protein curd having essentially the same properties.

The following illustrative examples are set forth to provide a clearer understanding of the invention and are not to be construed as limiting the principles which underlie the spirit and scope of the invention.

EXAMPLE 1

Protein is extracted from 1,000 grams of a commercial defatted soy flake having an NSI of 60, by soaking it in 7,500 grams of water for four hours. 5,500 grams of aqueous protein extract containing 4.5 weight percent protein and having a pH of 6.7 is separated from the soy flake residue by a press. The pH of the aqueous protein extract is adjusted to 6.0 by the addition of citric acid. The extract is heated to within a temperature range of 102° C. to 105° C. for 0.2 hours. The protein curd product which is formed is separated from the whey, washed with water, and centrifuged. The final protein curd product has a smooth and elastic texture, a tender mouth feel and an interstitial water content of 78% by weight. The product has a very light color similar to uncolored butter, and has essentially a bland taste.

EXAMPLE 2

Protein is extracted from 1,000 grams of a commercial defatted soy flake having an NSI of 60, by soaking it in 9,000 grams of water for four hours. 7,800 grams of aqueous protein extract containing 3.5 percent protein and having a pH of 6.8 is separated from the soy flake residue with a press. The extract is heated to within the temperature range of 95° C. to 98° C. for 10 minutes. The pH of the extract is then adjusted to 5.6 by the addition of 145 milliliters of a 12% solution of calcium chloride (molal concentration of 1.08) while stirring. The protein curd product which is formed is separated from the whey, washed with water and centrifuged. The pH of the whey at room temperature is 5.9. The final protein curd product contains 73% by weight of interstitial water and has an acceptable texture, mouth feel, color and taste. It is a firm and elastic material, yet gives a smooth and non-dry mouth feel. It is very suitable for hamburger-type applications.

EXAMPLE 3

Example 1 is repeated except no citric acid is added. The pH of the extract is adjusted from 6.6 to 6.3 by allowing it to ferment at 30° C. for 1 hour. The extract is heated to 85° C. The protein curd product which coagulates is separated from the whey and processed as described in Example 1. The interstitial water content of the protein curd product is 84% by weight. The properties of texture, mouth feel, color and taste are acceptable. It is a softer and more tender material than that of Example 2, and can be used for gelatin-type applications.

EXAMPLE 4

Example 1 is repeated except that no citric acid is added and the pH of the extract remains at 6.7. On heating, the entire liquid becomes a gel type, soft mass having an interstitial water content greater than 85%. It cannot be separated from the whey and has a strong, heavy taste which renders it unacceptable for food applications.

EXAMPLE 5

Protein is extracted from 1,000 grams of a commercial defatted soy flake having an NSI of 60, by soaking it in 5,000 grams of water for four hours. Calcium hydroxide is added to the suspension until the pH is 9.4. The aqueous protein extract is separated from the soy flake residue with a press. 11 ml of a 12 weight percent calcium chloride solution are added to each 100 ml of extract. The extract is then heated to within the temperature range of 100° C. to 103° C. for 10 minutes. The protein curd product is separated from the whey and processed in the same manner as the product of Example 2. The room temperature pH of the whey is 8.4. The final product has an acceptable interstitial water content of 78% and an acceptable elastic texture and mouth feel. The product, however, is characterized by a strong rotten egg odor and has a dark grey color. After repeated water washings, the odor and color are improved but do not reach an acceptable level.

EXAMPLE 6

Example 1 is repeated except that the pH is adjusted to 4.6. The product has an interstitial water content of less than 70% and the mouth feel of the product is dry and pulpy and thus unacceptable.

EXAMPLE 7

Example 2 is repeated except that the pH of the whey is adjusted to 4.6. The product has an interstitial water content of less than 70% and the mouth feel of the product is dry and pulpy and thus unacceptable.

EXAMPLE 8

The purpose of this Example is to show the criticality of having a protein concentrate in the aqueous extract of at least 2.0 weight percent. Example 1 is repeated except that the 1,000 grams of commercial defatted soy flake is soaked in 15,000 grams of water. The aqueous protein extract contains less than 2.0 weight percent protein. The final protein curd product has an interstitial water content less than 70% by weight and has an unacceptably grainy and dry mouth feel.

EXAMPLE 9

Example 1 is repeated except the aqueous protein extract is heated to 55° C. No curd is formed.

EXAMPLE 10

Example 1 is repeated except the aqueous protein extract is heated to 200° C. The isolated product has an interstitial water content lower than 70% by weight. The product is an unacceptable dark greyish-brown, tough and coarse material.

EXAMPLE 11

Example 2 is repeated except that 4 millimoles of calcium chloride are used for each gram of protein. The interstitial water content is less than 70% by weight, thus rendering a product having a powdery, pulpy and thus unsuitable texture and mouth feel.

EXAMPLE 12

Example 2 is repeated except that 0.02 millimoles of calcium chloride are used for each gram of protein. No curd is separated from the extract.

EXAMPLE 13

The purpose of this Example is to show the correlation between pH of the coagulation reaction and the content of interstitial water in the final product. As previously discussed, the texture and mouth feel properties of the product are unacceptable when the interstitial water content is less than 72% by weight or greater than 85% by weight.

Example 1 is repeated six times using varying amounts of malic acid as the coagulate, to provide pH values of 6.4, 6.25, 6.0, 5.8, 5.6 and 5.5. The extract is heated to 95° C. and the weight percent protein in the extract is 6.3%. The interstitial water content of the product is determined for each of the pH values and the results charted in FIG. 1. From the graph, it is seen that the interstitial water content of the final product is a function of the pH of the coagulation reaction.

EXAMPLE 14

The purpose of this Example is to show the relationship between the pH of the whey and the color of the product. Example 2 is repeated except the extract contains 5.5% by weight of protein and the coagulation is carried out at 100° C. The hot extract is divided into 12 parts and the pH of the whey is adjusted to varying values by adding appropriate quantities of calcium chloride and calcium hydroxide. 12 separate products are isolated and the color of each is monitored by a reflection densitometer (Macbeth Quanta Log Densitometer). The monitoring is accomplished by preparing a paste from 0.5 grams of product and applying it to two square centimeters of white paper having a density of 0.12 du. The results of these tests are set forth in FIG. 2. From the graph, it is seen that when the pH of the whey exceeds 8.0, the density of the product increases, meaning that the color becomes unacceptable for certain applications and the product has limited use.

EXAMPLE 15

The purpose of this Example is to show that when the pH of the whey is greater than 8, numerous washings are required for the product to have an acceptable odor.

Example 14 is repeated. Each of the 12 products is washed repeatedly to make the odor of the product acceptable. The results of this test are also set forth in FIG. 2.

EXAMPLE 16

Example 1 is repeated except that a water extract of mung bean which has a protein content of 2.8% is added to the soy protein extract in the volume ratio of four parts soy extract to one part mung bean extract. The product obtained from coagulation has 76% interstitial water content and has acceptable texture, mouth feel, color and flavor.

The invention has been described with reference to preferred embodiments thereof, but it is understood that variations and modifications can be effected within the spirit and scope of the invention.

I claim:

1. A process for preparing a high protein, low fat foodstuff material comprising the steps of:
   a. extracting protein from a defatted soy bean material with water to provide an aqueous protein extract having at least 2.0 weight percent protein,
   b. separating residual defatted soy bean material from the aqueous protein extract,
   c. coagulating protein from the aqueous protein extract to produce a protein curd product and a whey by adjusting the pH to within the range from about 5.4 to about 8.0 and heating the aqueous protein extract to within a temperature range from about 80° C. to about 170° C.,
   d. separating the protein curd product from the whey, and
   e. washing the protein curd product with water to produce a high protein, low fat foodstuff.

2. The process of claim 1 wherein the aqueous protein extract contains from about 3.5% to about 9% by weight of protein.

3. The process of claim 1 wherein the pH is adjusted to within the range from about 5.4 to about 6.4 by fermenting the aqueous protein extract at a temperature from about 20° C. to about 60° C.

4. The process of claim 1 wherein the pH is adjusted to within the range from about 5.4 to about 6.4 with a food grade acid.

5. The process of claim 1 wherein the pH is adjusted to within the range from about 5.4 to about 6.4 with a bivalent cationic salt.

6. The process of claim 1 wherein the pH is adjusted to within the range from about 5.4 to about 6.4 with a food grade acid and a bivalent cationic salt.

7. The process of claim 1 wherein the pH is adjusted to within the range from about 5.4 to about 8.0 with a food grade base and a soluble bivalent cationic salt.

8. The process of claim 7 wherein from about 0.2 millimoles to about 2.0 millimoles of soluble bivalent cationic salt is used as the coagulant for each gram of protein in the aqueous protein extract.

9. The process of claim 1 wherein the pH is adjusted to within the range from about 5.4 to about 6.4 prior to heating the aqueous protein extract to within the temperature range from about 80° C. to about 170° C.

10. The process of claim 1 wherein the pH is adjusted to within the range from about 5.4 to about 6.4 while the aqueous protein extract is within a temperature range from about 80° C. to about 170° C.

11. The process of claim 1 including adding an aqueous non-soy protein solution to the aqueous protein extract in an amount up to 30% by weight of the total resultant aqueous protein composition.

12. A high protein, low fat foodstuff material comprising the protein curd product prepared by the process of claim 1, said protein curd product having from about 72 weight percent to about 85 weight percent of interstitial water associated with the protein molecules.

13. A composition comprising a mixture of meat and the protein curd product of claim 12.

* * * * *